Aug. 12, 1941.　　　　P. LANDIS　　　　2,252,515
RAIL FASTENING MEANS
Filed Jan. 16, 1940

Inventor,
Paul Landis
Glascock Downing & Seebold
By: Attys

Patented Aug. 12, 1941

2,252,515

UNITED STATES PATENT OFFICE 2,252,515

RAIL FASTENING MEANS

Paul Landis, Zurich, Switzerland

Application January 16, 1940, Serial No. 314,147
In Switzerland September 10, 1938

5 Claims. (Cl. 238—283)

The present invention relates to improvements in and relating to rail fastening means in which below the rail as well as below the fixing nut for the rail bearings are provided which consist of yieldable material such as pneumatic tire sections or other rubber containing material which bearings resiliently take up the loading and relieving pressures and transmit them to the groundwork. In this way the creep of the rails is prevented and the often re-tightening of the nuts is avoided. The resilient bearing below the nut can be held by means of a carrier-piece or by the nut in such a manner that, under the tightening-pressure, the yieldable material can extend only towards the threaded part of the anchor bolt and firmly grasps it thus securing the nut against becoming loose.

The various objects and features of the invention will be readily understood from a consideration of the annexed drawing and the following description wherein several exemplary embodiments of the invention are disclosed.

In the accompanying drawing two embodiments of the present invention are represented.

Figure 1:
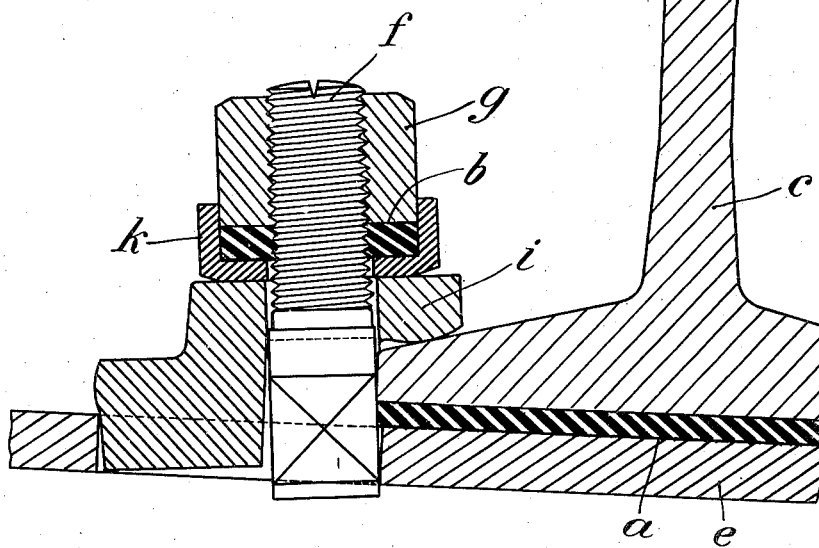
Fig. 1 is a sectional view of a railway rail showing one type of clamping means for securing the rail in place.
Figure 2:
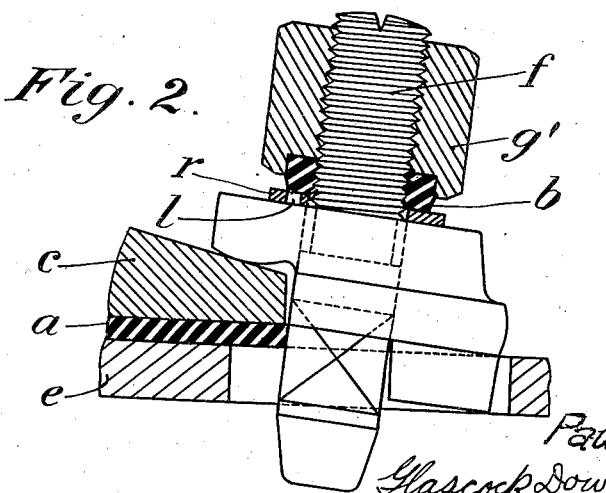
Fig. 2 is a sectional view of a modified clamping arrangement.

Referring now to Fig. 1, $c$ represents the rail, $e$ the sleeper which parts are connected one to another by means of the dogbolt $f$, nut $g$ and a clamp member $i$. Below the rail $c$ a rubber plate $a$ is arranged and below the nut $g$ a washer $b$ is provided, this plate and bearing being preferably made from pneumatic tire casings. The washer $b$ is surrounded by a hexagonal cup-shaped member $k$ with the upper portion of this catch surrounding the nut $g$ in such a manner that by turning this nut the cup-shaped member $k$ is taken with. In Fig. 2 the disk or washer $b$ is disposed in a recess of a nut $g'$ and rests upon a metal disk $r$ provided with a number of holes $l$ adapted to provide a connection between the washer $b$ and the disk $r$ so that the metal disk is rotated when the nut is tightened.

For fastening the rail $c$ on the sleeper $e$ the nut $g$ is tightened until it has reached the necessary tightening pressure between 2,600 and 3,000 kilograms whereby in the construction shown in Fig. 2 the washer $b$ is nearly fully pressed into the recess of the nut $g'$. By the pressing action the air below and above the rubber plate $a$ is expelled so that this plate sucks itself on the sleeper and on the rail.

Trials have shown that with a tightening pressure of 2,600 kilograms the washer $b$ of 5.5 millimeters thickness was reduced in thickness by 1.9 millimeters and the plate $a$ of a thickness of 4.2 millimeters under a pressure of 5,200 kilograms was reduced in thickness only by 0.41 millimeter. Under the wheel pressure of the heavy machines the plate $a$ is reduced in thickness by 0.06 millimeter therefore the bottom washer is relieved by 0.06 millimeter and stands therefore under nearly the same tightening pressure. Now between two wheel-pressures a relieving pressure follows which is directed towards the washer $b$. The amount thereof is undetermined; it may surmount however the tightening pressure and tends to compress the washer $b$ still more. As the washer is enclosed however fully either by the cup-shaped member $k$ or by the nut $g'$ and cannot extend in either direction even by a great increasing of pressure by 2,000 kilograms, a compression of only 0.05 millimeter can be obtained. The plate $a$ is relieved by this amount which corresponds to a tightening pressure of 3,000 kilograms. Even a greater pressure can never neutralize the tightening pressure of the plate $a$, therefore this plate can never become free, by virtue of the enclosing of the washer $b$.

While the invention has been described with reference to specific structural details it will be appreciated that changes may be made therein by those skilled in the art. Such modifications may be made without departing from the spirit and scope of the invention as set forth in the appended claims.

I claim:

1. In a railway track structure, a railway rail having a lateral flange, a support for said rail, a clamp member extending over said flange, a bolt engaging said support, a nut threaded on said bolt for moving the clamp member into engagement with the flange of the rail, a washer of resilient material mounted on said bolt immediately under said nut, a metal member mounted on the bolt between the clamp member and the resilient washer, and means providing a positive drive connection between the nut and the metal member whereby the metal member is rotated when the nut is turned on the bolt.

2. In a railway track structure, a railway rail, a support for said rail, a clamp member extending over a flange of the rail, a bolt engaging said support, a nut threaded on said bolt for moving the clamp member into engagement with the flange of the rail, a yieldable washer mounted on the bolt under said nut, a rigid member mounted on the bolt between the yieldable washer and the clamp member, and means associated with the nut substantially encasing the periphery of the yieldable washer preventing outward expansion of the yieldable washer during tightening of the nut whereby the yieldable washer expands inwardly into engagement with the bolt to prevent loosening of the nut.

3. In a railway track structure, a railway rail having a lateral flange, a support for said rail, a clamp member projecting over said flange, a bolt engaging said support, a nut threaded on said bolt to move the clamp member into engagement with the flange of the rail, a washer of resilient material mounted on said bolt immediately under said nut, a rigid member mounted on the bolt forming a disk between the resilient washer and the clamp member, means substantially encasing the periphery of the resilient washer preventing outward expansion thereof when the washer is compressed whereby the resilient material expands inwardly into engagement with the bolt to prevent loosening of the nut, and means providing a positive driving connection between the nut and the disk whereby the disk is rotated when the nut is turned on the bolt.

4. In a railway track structure, a railway rail, a support for said rail, a clamp member projecting over a flange of the rail, a bolt engaging said support, a nut threaded on said bolt for moving the clamp member into engagement with the flange of the rail, a washer of resilient material arranged under said nut and surrounding said bolt, a cup-shaped member mounted on said bolt between the resilient washer and the clamp member preventing outward expansion of the resilient washer upon compression thereof, and said cup-shaped member embracing the nut so as to be rotated thereby.

5. In a railway track structure, a railway rail, a support for said rail, a clamp member projecting over a flange of the rail, a bolt engaging said support, a nut threaded on said bolt for moving the clamp member into engagement with the flange of the rail, said nut having a recess in the lower face thereof, a washer of resilient material mounted in said recess, an apertured disk mounted on the bolt between the resilient washer and the clamp member whereby the resilient washer expands into the aperture of the disk upon movement of the nut towards the clamp member so that the disk is rotated with the nut.

PAUL LANDIS.